US010318817B2

(12) United States Patent
Kanga et al.

(10) Patent No.: US 10,318,817 B2
(45) Date of Patent: Jun. 11, 2019

(54) METHOD AND APPARATUS FOR SURVEILLANCE (71) Applicant: iOmniscient Pty Ltd, Gordon, New South Wales (AU)

(72) Inventors: Rustom A. Kanga, Gordon (AU); Ivy Lai Chun Li, Gordon (AU)

(73) Assignee: iOmniscient Pty Ltd, Gordon (AU)

( * ) Notice: Subject to any disclaimer, the term of this patent is extended or adjusted under 35 U.S.C. 154(b) by 0 days.

(21) Appl. No.: 14/794,362

(22) Filed: Jul. 8, 2015

(65) Prior Publication Data

US 2016/0012297 A1 Jan. 14, 2016

(30) Foreign Application Priority Data

Jul. 8, 2014 (AU) ................................. 2014902643
Jun. 12, 2015 (AU) ................................. 2015902215

(51) Int. Cl.
*G06K 9/00* (2006.01)
*G06T 7/246* (2017.01)

(52) U.S. Cl.
CPC .......... *G06K 9/00771* (2013.01); *G06T 7/251* (2017.01); *G06T 2207/10028* (2013.01); *G06T 2207/30201* (2013.01); *G06T 2207/30242* (2013.01)

(58) Field of Classification Search
CPC .......... G06K 9/00771; G06K 9/00221; G06K 9/00711; C12M 1/38; G06T 2207/10028; G06T 2207/30201; G06T 2207/30242; G06T 7/0051; G06T 7/251
See application file for complete search history.

(56) References Cited

U.S. PATENT DOCUMENTS

| | | | | |
|---|---|---|---|---|
| 6,295,367 | B1 * | 9/2001 | Crabtree | G01S 3/7865 382/103 |
| 9,384,407 | B2 * | 7/2016 | Wang | G06K 9/00771 |
| 2005/0201612 | A1 * | 9/2005 | Park | G06K 9/00778 382/154 |
| 2008/0172261 | A1 * | 7/2008 | Albertson | G06K 9/00335 382/103 |
| 2011/0081045 | A1 * | 4/2011 | Lee | G06K 9/00362 382/103 |
| 2014/0139633 | A1 * | 5/2014 | Wang | G06K 9/00201 348/46 |

* cited by examiner

*Primary Examiner* — Tom Y Lu
(74) *Attorney, Agent, or Firm* — Fitch, Even, Tabin & Flannery LLP (57) ABSTRACT

There is included a method of surveillance comprising the steps of obtaining image data of a scene, the image data including depth data providing depth information, processing the depth data to identify potential head object(s), that may represent head(s) of persons in the scene, and processing the image data to discount objects within a predetermined lateral distance of potential head objects.

17 Claims, 5 Drawing Sheets

FIGURE 6

US 10,318,817 B2

METHOD AND APPARATUS FOR SURVEILLANCE

CROSS-REFERENCE TO RELATED APPLICATIONS

This application claims priority from Australian Patent Application No. 2014902643, filed Jul. 8, 2014, and Australian Patent Application No. 2015902215, filed Jun. 12, 2015, both of which are hereby incorporated by reference in their entirety.

FIELD OF THE INVENTION

The present invention relates to a method and apparatus for surveillance, and, particularly, but not exclusively, to a method and apparatus for people surveillance and people behaviour analysis.

BACKGROUND OF THE INVENTION

Video surveillance is wide spread for security applications. Modern surveillance networks may operate in a diverse range of locations. Examples include public spaces (including streets and parks), public and private buildings, infrastructure (such as railway stations), airports, factories, military bases and other locations.

It is well known to monitor video surveillance manually, one or more operators monitoring a number of video terminals, for example. It is difficult for an operator to monitor many terminals at once, however, or even a single terminal, to obtain information or identify incidents that might require action. Various systems have been proposed, therefore, to automate some aspects of video surveillance in order to supplement or replace manual operators. These include automatic face recognition systems, systems for automatically identifying incidents (such as alarms) and responding (see PCT/AU2014/00098, the disclosure of which is incorporated herein by reference), and other automated or partially automated systems.

One requirement of video systems surveying people, is to be able to make a count or estimate of the numbers of people. For example, numbers of people in a hotel lobby, railway station or airport, to determine that, for example, the number of people is not over a requisite amount. In crowded locations this is a very difficult (if not impossible) job for a manual operator, even where that manual operator is dedicated purely to the task of counting the number of people.

Systems are known that use overhead 2-dimensional cameras to detect the heads of people in the field of view for the purpose of people counting. Prior art systems use motion detection and "blob" extraction in each frame. Blobs are searched for circles due to the fact that in a top-down view, heads resemble circles. Alternative methods look at body shape to recognise people. All such methods suffer from the usual 2-dimensional computer-vision challenges of carrying out detection in varying light conditions and in occluded scenes. Moreover, known circle-detection algorithms can misfire in scenes with different types of flooring (tile/carpet patterns), and so such methods and systems are not robust.

Depth sensors and 3-dimensional cameras are now available which can provide information on depth. These may be usable to facilitate detection of heads. There is still an issue on accurate and resolvable head detection, however, where other artefacts may come into the depth field being analysed from the 3D information, such as bags being carried on shoulders, hands being raised at head level or above head level, or other objects at that depth level interfering with the head count.

Other requirements for surveillance include monitoring the behaviour of people, objects, and animals. Also to monitor the behaviour of individuals in groups. Traditional methods of using two-dimensional computer vision suffer from a number of challenges, such as differentiating light or thermal changes.

In the case of non-motion detection of objects, people, etc. (see Australian Patent 2002342393, the disclosure of which is incorporated herein by reference) light and thermal shadows can cause false alarms.

SUMMARY OF THE INVENTION

In accordance with a first aspect, the present invention provides a method of surveillance, comprising the steps of obtaining image data of a scene, the image data including depth data providing depth information, processing the depth data to identify potential head object(s), that may represent head(s) of persons in the scene, and processing the image data to discount objects within a predetermined lateral distance of potential head objects.

In an embodiment, the remaining potential head object(s) are identified as head objects representing the heads of persons in the scene.

It is an advantage of at least an embodiment, that because objects within a predetermined distance of potential head objects are discounted, this avoids identifying objects such as shoulders, bags carried on shoulders or hands extending above the head being identified as head objects. Advantageously, a more accurate identification of head objects is therefore obtained.

In an embodiment, the predetermined distance is the distance between heads of a person standing next to each other. In an embodiment, the distance is 1 meter, in other embodiments approximately 1 meter, in other embodiments it is between 30 cm and 1 meter, in embodiments between 30 cm and 0.8 of a meter, in embodiments between 40 cm and 60 cm, in embodiments approximately 50 cm.

In an embodiment, the identified head objects may be counted, to provide a count of the number of persons in the scene.

In an embodiment, the image data comprises a video feed. In the embodiment where the image data comprises a video feed, the method comprises the further step of processing the image data to track motion of one or more identified head objects. The tracked motion may be lateral motion and/or motion within the depth field. In an embodiment, tracking of motion of a head object can be utilised to analyse behaviour of a person in the field of view. In an embodiment, the tracking of motion of a head object can be used to determine whether a person has fallen over (they may have slipped and fallen, for example). Appropriate action can then be taken.

In an embodiment, tracking of motion can be used for other analysis, such as directional flow analysis of movement of people in and through the scene.

In an embodiment, the method includes the further step of detecting arm motion, using a sensor arranged to detect arm motion, and analysing the arm motion. Arm motion analysis may be used to analyse behaviour, such as identifying rapid arm motion which may indicate assault, for example.

In an embodiment, the method includes the step of tracking speed of motion. The speed of motion can indicate particular behaviours. This can be rapid arm motion (potentially indicating assault), motion of a head which may indicate slipping and falling; motion of a head which may indicate running through an area (which an operative may wish to observe in case there is a security issue). The speed of motion can indicate other behaviours.

In an embodiment, only image information within a predetermined depth is analysed to determine objects to be processed. In an embodiment, image information below a predetermined depth is discounted. It is assumed that the image information below a certain depth will not relate to head objects. In an embodiment, for behavioural analysis, once head objects have been identified, image information tracking the head objects below the predetermined depth may be analysed.

In an embodiment, the image data is obtained from above the scene. In other embodiments, the image data may be obtained from an angle or from the side of the scene or from other orientation. In an embodiment, image data may be obtained from a number of orientations. For example, image data from above can be used for detecting head objects and counting the number of heads. Image data from other orientations can be used to assist in analysis of behaviour. For example, behaviours such as fighting or slips and falls may be detected. The image data may be also used for non-motion detection.

In accordance with a second aspect, the present invention provides an apparatus for surveillance, the apparatus comprising an image sensor arranged to obtain image data of a scene, the image data including depth data providing depth information, and a processor arranged to process the depth data to identify potential head objects, that may represent heads of persons in the scene, the processor being arranged to process the image data to discount objects within a predetermined distance of potential head objects.

The image sensor may be a 3-dimensional camera, or a depth sensor and a 2-D camera.

In an embodiment, the processor is arranged to provide a count of the head objects, to provide a count of the persons in the scene.

In an embodiment, the image sensor is a video camera and the image data comprises a video feed. The processor is arranged to track motion of head objects in order to track motion of persons within the scene. In an embodiment, the processor is arranged to determine behaviour of persons being tracked on the basis of their motion. In an embodiment, the processor is arranged to analyse the behaviour to determine whether a person has fallen. This may be done by analysing motion of the head and trajectory of the motion.

In an embodiment, the processor may be arranged to analyse motion to determine flow direction of persons in the scene.

In an embodiment, the apparatus comprises an arm motion sensor, and the processor may be arranged to process arm motion data to determine arm motion of persons in the scene. The arm motion may be analysed to determine behaviours, such as fighting, for example.

In an embodiment, a plurality of image sensors are provided to provide image data to the processor. For example, a plurality of image sensors may be used to monitor a single large location, requiring a wide field of view. Alternatively or additionally, separate locations may be monitored at the same time by one or more image sensors positioned at those locations.

In accordance with a third aspect, the present invention provides a computer program, comprising instructions for controlling a computer to implement a method in accordance with the first aspect of the invention.

In accordance with a fourth aspect, the present invention comprises a computer readable medium, providing a computer program in accordance with the third aspect of the invention.

In accordance with a fifth aspect, the present invention provides a data signal comprising a computer program in accordance with the third aspect of the invention.

In accordance with a sixth aspect, the present invention provides a method of surveillance, comprising the steps of obtaining image data of a scene, the image data including depth data providing depth information, processing the image data to identify objects, and utilising the image data and depth data to determine the behaviour of objects in the scene.

In an embodiment, the objects are people and the analysis may determine motion of persons in the scene. In an embodiment, the analysis may determine slip and fall motion. In an embodiment, the analysis may determine motion of people walking or running through the scene. In an embodiment, the analysis may determine arm motion and identify fighting behaviours.

In an embodiment, the objects may be objects other than people. The analysis may detect stationary objects.

In embodiments, behaviours such as fighting, slips and falls and other behaviours of individuals and groups can be detected with more veracity, utilising the depth data in concert with the image data in the scene.

In accordance with a seventh aspect, the present invention provides an apparatus for object surveillance, the apparatus comprising an image sensor arranged to obtain image data of a scene, the image data including depth data providing depth information, and a processor arranged to process the depth data to identify objects, and to analyse the objects to determine behaviour.

The objects may be persons in the scene. The objects may be other objects in the scene.

In accordance with an eighth aspect, the present invention provides a computer program, comprising instructions for controlling a computer to implement a method in accordance with the sixth aspect of the invention.

In accordance with a ninth aspect, the present invention comprises a computer readable medium, providing a computer program in accordance with the eighth aspect of the invention.

In accordance with a tenth aspect, the present invention provides a data signal comprising a computer program in accordance with the eighth aspect of the invention.

In accordance with an eleventh aspect, the present invention provides a method of surveillance, comprising the steps of obtaining image data of the scene, the image data including depth data providing depth information, and processing the image data to identify potential head objects of persons, and further processing the image data to identify relative rapid motion of limbs.

In accordance with a twelfth aspect, the present invention provides an apparatus for surveillance, the apparatus comprising an image sensor arranged to obtain image data of a scene, the image data including depth data providing depth information, a processor arranged to process the depth data to identify potential head objects, and to process the image data to identify relative rapid motion of limbs.

In accordance with a thirteenth aspect, the present invention provides a computer program comprising instructions for controlling a computer to implement a method in accordance with the eleventh aspect of the invention.

In accordance with a fourteenth aspect, the present invention provides a computer readable medium, providing a computer program in accordance with the thirteenth aspect of the invention.

In accordance with a fifteenth aspect, the present invention provides a data signal comprising a computer program in accordance with the thirteenth aspect of the invention.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION OF THE PREFERRED EMBODIMENTS

Figure 1:
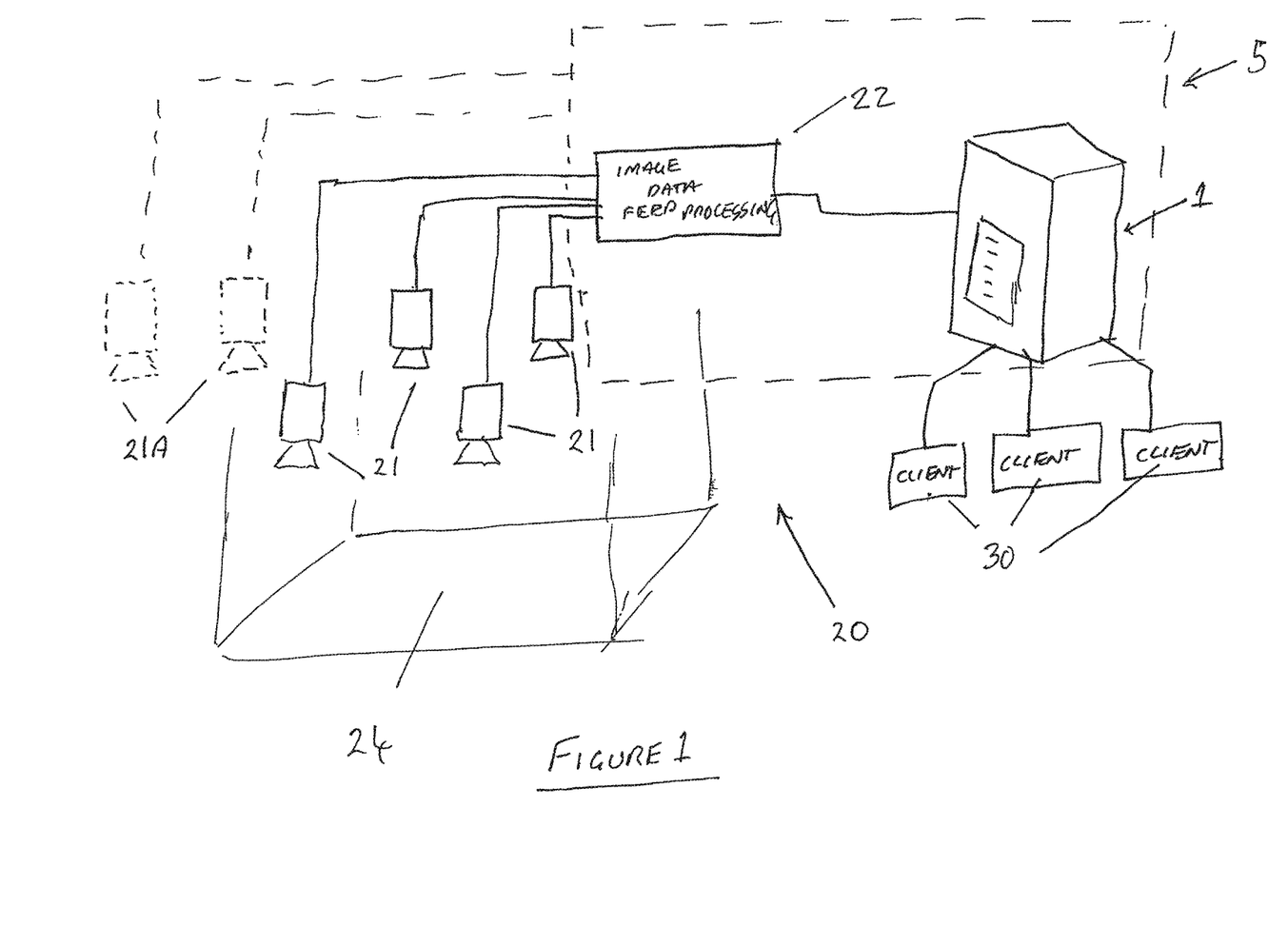
FIG. 1 is a schematic diagram of an apparatus and system in accordance with an embodiment of the present invention.

Referring to FIG. 1, an apparatus in accordance with an embodiment of the invention is generally designated by reference numeral 20. The apparatus comprises a plurality of sensors 21 which, in this example embodiment, are imaging devices which provide depth information. The sensors 21 may be, for example, 3D cameras. A suitable camera is the Kinect™ sensor from Microsoft®. Other 3D cameras could be used, however.

In alternative embodiments, the sensors may comprise separate depth sensors and 2-D cameras.

The cameras 21, as well as providing 2D pixel information also provide depth frames, to form a 3D depth factor (x, y, z coordinates). Depth information can therefore be extracted from image data from the sensors 21.

A computing system 5 receives the data feed from each of the sensors 21 which is processed by image data processing 22 to provide 3D image data of the scene 24.

The scene 24 may be at any location. It may be a public building, such as an airport, railway lobby, or any other public building. It may be an office lobby, it may be an open public space, or it may be anywhere that surveillance of people is required for security or other purposes.

The processing system 5 may be connected to multiple image sensors that may monitor other separate locations. This is illustrated in FIG. 1 by image sensors 21A shown in ghost outline. The processor 5 may therefore monitor and provide information from image data from many different locations.

In FIG. 1, four image sensors 21 are shown for monitoring scene 24. Each image data from each sensor 21 may be processed separately, and the scene 24 therefore divided into sectors which are separately monitored. Alternatively, the image data may be processed so that the sectors covered by the image sensors 21 are effectively converged to one sector and the image data processed for that sector as a single field of view.

Although four cameras are shown in FIG. 1 covering scene 24, there may be more or less cameras depending upon the scene being surveyed. There may be a single camera, for example, where the camera has a wide enough field of view to cover the scene.

The processing arrangement 5 may be any type of computing system which is programmed appropriately with software to process the image data, including the depth data, to identify potential head objects (of potential persons) within the scene 24.

The processing arrangement 5 may be networked to one, some or many image sensors 21, monitoring one, some or many scenes.

In the embodiment shown, the processing arrangement is a server computer 1 programmed with appropriate software. The image data feed processing apparatus may be implemented by the server 1 or may be implemented separately. For example, it may be implemented in the sensors or near the sensors 21.

The server 1 is arranged to serve client systems 30, which can include computer terminals or client computers (thin client or thick client) which can be utilised to monitor and control the system from remote locations.

Figure 2:
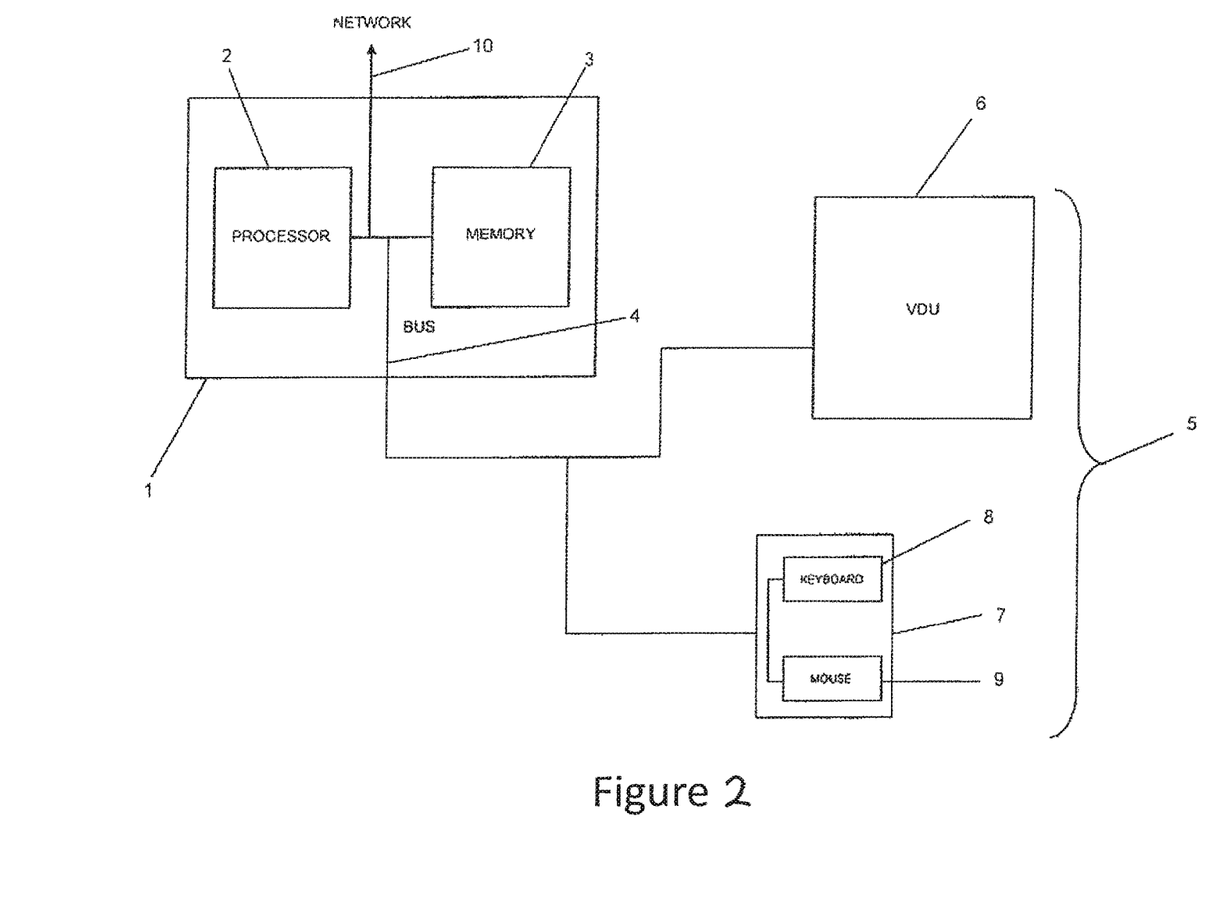
FIG. 2 is a schematic diagram of a computing device which may facilitate implementation of the system of FIG. 1.

FIG. 2 is a schematic block diagram of an example computing system which might be utilised for implementation of the server 1 and processing apparatus 5.

The illustrated computing system comprises a computer 1 which includes a processor 2 and memory 3. The processor 2 is arranged to process programme instructions and data in a known manner. Memory 3 is arranged to store programme instructions and data also in a known manner. Processor 2 may constitute one or more processing means, such as integrated circuit processors. The memory 3 may comprise any known memory architecture and may include hard disk, IC memory (ROM, PROM, RAM, etc.), floppy disks and other types of additional memory such as CD ROM, and any other type of memory.

A BUS 4 is provided for communication between the processor 2 and memory 3 and also communication with external components. In this case the external components include a user interface 5. The user interface 5 includes a visual display unit 6 for displaying information to a user. The VDU 6 may display information in graphical format or any other format depending upon the programme instructions being processed by processor 2.

The user interface 5 also includes user input means 7 which in this example include a keyboard 8 (which in this example may be a standard QWERTY keyboard) and a mouse 9. The mouse 9 may be used to manipulate a graphical user interface (GUI) if a GUI is provided by software running on the computer. A network connection 10 is also provided for connecting to a network which may include a communication network and other computers/computing systems, and also may connect to imaging severs 21.

The computing system of FIG. 1 may be implemented by any known type of computing hardware such as, for example, a PC, by a number of networked PCs if required to implement a system of this embodiment, by a "mainframe architecture" including a remote computer and user workstations connected to the remote computer, by a client-server architecture, including a client computer accessing a server computer over a network, or by any other computing architecture.

Parts of the system may be housed in the "cloud". This embodiment of the present invention is implemented by appropriate software providing instructions for operation of the computing system hardware to implement the system of the embodiment and implement the method of the embodiment.

Part of the system or the entire computer system may be portable, and may be implemented, for example, by a laptop or tablet computer, or other portable device.

Other configurations or types of computer systems can be equally well used to implement the described techniques. The computer system 1 described above is described only as an example of a particular type of system suitable for implementing the described embodiments.

Figure 3:
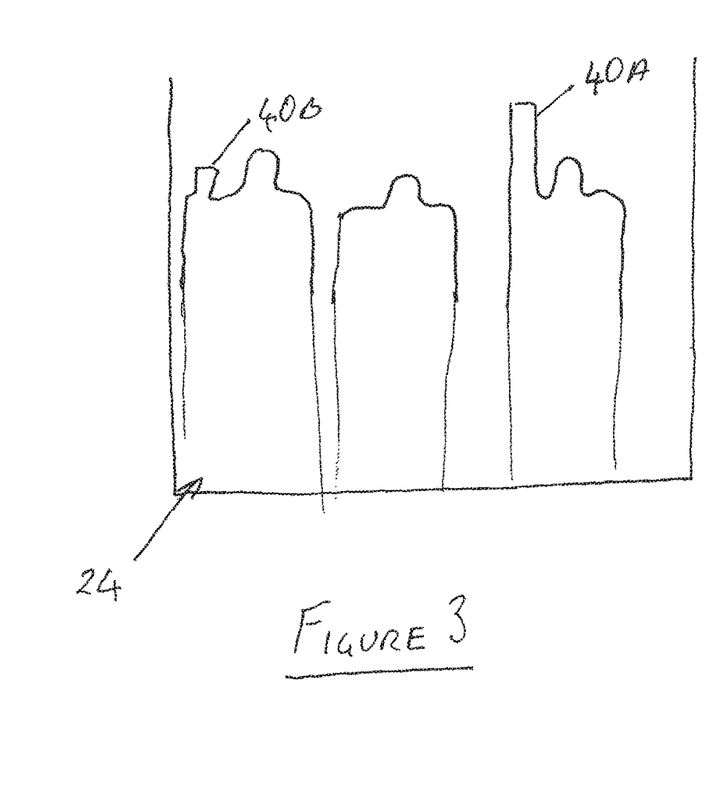
FIG. 3 is a schematic diagram of a view from the side of a scene being surveyed by the apparatus of FIG. 1.
Figure 4:
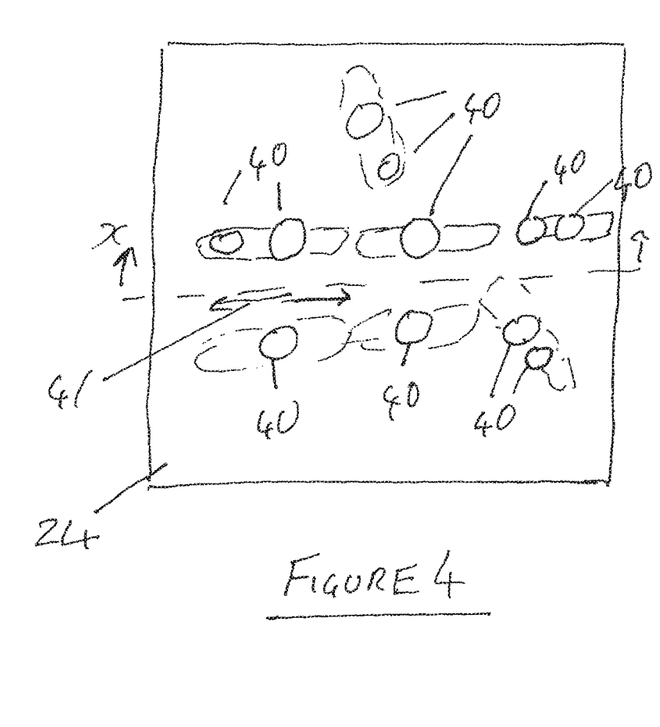
FIG. 4 is a schematic top-down view of the scene of FIG. 3.

FIGS. 3 and 4 show schematic representations of what might be viewed in the scene 24 being monitored by the sensors 21 in FIG. 1. FIG. 4 shows a representation of a depth down view. FIG. 3 shows a section on xx at FIG. 4 from a side view (not imaged by the cameras 21).

There are a number of people in the scene (seven in this example). The image sensors detect a top down view, as in FIG. 4. The pixel and the depth sensor frame essentially forms a 3D depth factor (XYZ coordinates). Motion detection on depth frames involves performing foreground extraction, which yields pixels in the scene that undergo a change in their respective distances from the sensor. Thus the floor and the stationary objects, with static depths, gets subtracted from the processed frame. All further processing is carried out on the foreground pixels (which correspond to moving objects). The foreground extracted depth frame is then processed by an algorithm, such as a watershed algorithm, to determine regions of local minima in the scene. These pools of local minima (distance from the sensor is indirectly proportional to the height of the object) correspond to the body parts of the person closest to the sensor (head and shoulders). Post-processing of the obtained regions of local minima involves threshold to remove certain false detections (due to slight inaccuracies of the sensor). Subsequently extraction of contours of the detected regions of local minima are carried out. Large enough contours are retained and the smallest circle that encloses each contour corresponds to a detected head object. In FIG. 4, each of the circles shown is a potential head object (each circle is referenced with reference numeral 40 as a potential head object). It can be seen, particularly from FIG. 3, that all these potential head objects are not actual heads. For example, one of the head objects 40A in FIG. 3 and FIG. 4 is in fact a raised arm. Another 40B is an object being carried on a person's shoulder, such as a bag.

In order to distinguish actual head objects from false head objects, objects within a predetermined distance of each other are discounted. For example, in this embodiment, objects within half a meter of a head object are discounted. The half meter is illustrated by the arrows 41 in FIG. 4. This will mean that objects such as 40A and 40B will not be counted as head objects. Note that the actual head objects next to 40A and 40B may be discounted instead of the false head objects, but this will not be a problem when it comes to counting a number of people, as each object which is considered to be a head object (whether it is or isn't) will relate to a single person.

To keep track of detected heads, the positions of their respective sensors are considered as a measure of head movements and then they are counted for, for example, at the entry and/or exit points in the defined areas of interest. Head tracking, and therefore counting, can be further improved in comparison to the conventional method using 2D images, by making use of the heights that the detected heads are from the depth sensor.

The number of persons in the scene can therefore be counted, and the motion of the persons can be tracked. Tracking of the motion can also be used to determine behaviour. For example, slip and fall detection could be implemented by head objects suddenly changing in distance in the depth direction. The velocity of the change can be used to determine whether the person is just bending down to pick up an object, or they are actually falling. It can be used to detect people moving in an incorrect direction (e.g. going from a landside to airside in an airport), and other behaviour analytics.

Figure 5:
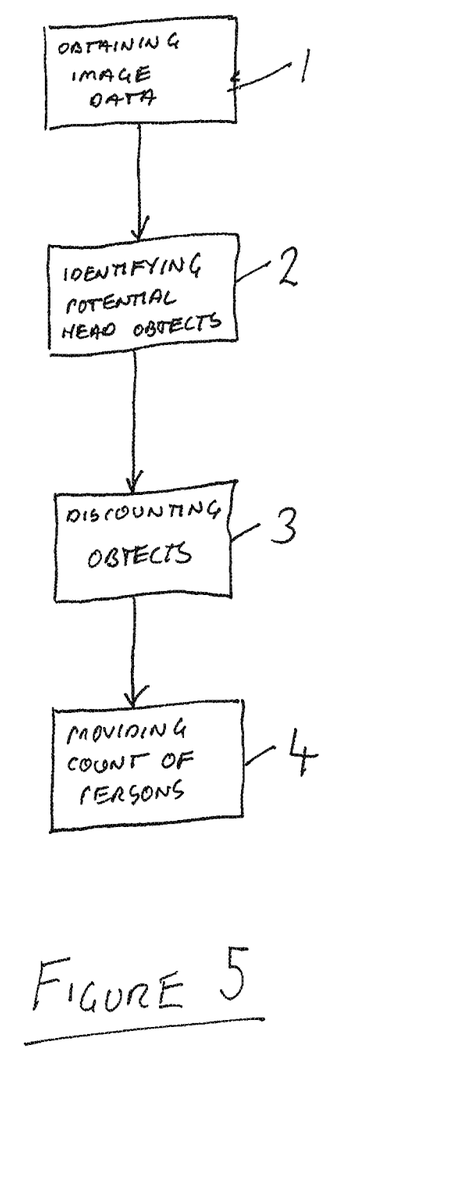
FIG. 5 is a flow diagram illustrating operation of an embodiment of the present invention.

Referring to FIG. 5, a process for counting objects using an apparatus in accordance with this embodiment is shown. At step 1, image data is obtained by the 3D sensors. The image data is processed at step 2 to identify potential head objects. At step 3, objects that are too close to another object are discounted. The remaining head objects are used to provide a count of the persons in the scene (step 4).

In more detail, at step 1, image data is obtained which includes both depth data and 2D image information. Pixels below a minimum height from the floor (a predetermined minimum) are discounted. The predetermined minimum may be preset depending upon the type of surveillance and conditions. For example, it may be preset well below the estimated height of a child. The step of background subtraction is carried out, by identifying over time objects that remain stationary. Using a background subtraction technique, such as a Gaussian Mixture Model, stationary objects, objects with static depths and other background information get subtracted from the frame to be processed.

Local minimum distances from the image sensor are then determined These local minimum distances of objects essentially show the highest points of objects within the localities, which are most likely to be head objects. A grouping of neighbouring pixels at the local minima is determined to be an "object". Where there are a grouping of neighbouring pixels, that size of that grouping may be used to determine whether the object is likely to be a head. As well as a number of neighbouring pixels, the distance of the pixels from the sensor must also be taken into account. For example, where a head is further away from the sensor (e.g. in the case of a child's head) then it will comprise less pixels. The depth information must also, therefore, be taken into account when determining potential head objects.

A precalibration step can be carried out, to calibrate the system for identification of head objects. In one embodiment, an operator may observe known head objects and graphical user interface to "draw" the head objects on a display. The system learns the number of pixels that signify a head object, also independence on depth information.

Using the depth information, the grouping of pixels and the calibration information regarding the average size of a head object depending on depth, a number of potential head objects are established (step 2).

A "buffer" of distance is then established around each potential head object to allow for human separation. If the potential head objects are too close, then one of the head objects will not be counted as a head. For example, it could be an object such as a ball or a bag being carried at shoulder height and does not signify a person. Further, a combination of image and depth information may be used to confirm the head object is a head.

The size of the buffer may depend upon application, and the distance from the camera. It may be given in terms of pixels or real distance. The distance may be 1 meter (considered to be separating the heads of two people standing together); between 30 cm and 1 meter; between 30 cm and 0.8 meters; between 40 cm and 60 cm; or approximately 50 cm. The distances will be represented by numbers of pixels in the frame, such that the number of pixels representing the distance will be calibrated and will depend upon the distance of the head objects from the sensor (depth distance).

Shadows reflected from reflective objects (e.g. fridges, shiny tables, etc.) can also be potentially identified as head objects. In many cases, providing the buffer distance will deal with this. Motion detection of shadows may also be applied (shadows tend to move very differently from people) to discount the shadows. Once objects have been discounted (step 3) the remaining potential head objects can provide a count of persons (step 4).

If, over a period of time, it appears that false detections are occurring, algorithms such as Hough Circle Transforms can be used to more accurately determine circle shapes and therefore heads.

Figure 6:
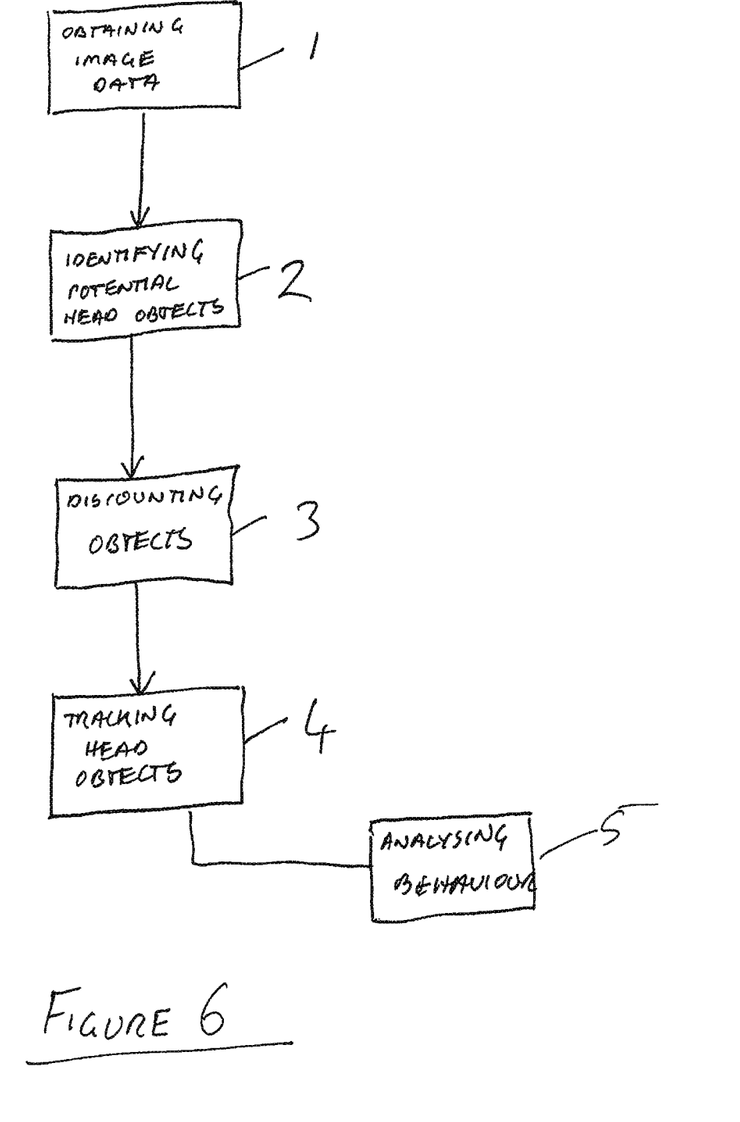
FIG. 6 is a flow diagram illustrating operation of another embodiment of the present invention.

FIG. 6 shows a process for implementing tracking. The first three steps are the same as for FIG. 5. Once the head objects have been determined, at step 4, motion of the head objects is tracked. At step 5, the behaviour of the persons is determined depending upon the motion of their heads and using analytics to determine what that motion might entail. There are a number of ways of determining behaviour. In this embodiment, the motion may be analysed by obtaining an estimate of the direction and speed (sometimes referred to as the vector) at which the head is moving. An estimate is then made of where the head is likely to be in the next frame or the next few frames. A head in the same general area is assumed to be the same head. Where the head is moving in a particular direction with a particular velocity, a determination may then be made by the processor that an accident has happened and a person is falling or has fallen. Appropriate action can be taken.

Algorithms such as a Kalman Filter may be used for tracking. If the person is too close to the sensor or if the frame rate drops, then the Kalman Filter (or other algorithms that may be used in place of the Kalman Filter) may lose track. In this case, several methods may be used to adjust. If the frame rate drops, automatically increase the distance used for track prediction. If the distance to a camera falls below a certain level, automatically increase distance used for track prediction. Algorithms can learn as processing progresses.

For behavioural determination such as "slip and fall" a number of processes can be utilised. If the determined head object being tracked suddenly increases its depth distance from the sensor, a determination could be made that a person has sat down or is tying their shoelaces. Or, the person could have slipped and fallen. Which of these behaviours has occurred can be determined based on the speed of change of the head object moving away from the camera. Over a threshold, a determination can be made that a slip and fall event has occurred, and an operator may be alerted to view the video.

In addition or as an alternative, the aspect ratio of the person image can be determined This can either be done from a camera above or a camera slightly angled. Change in aspect ratio can indicate whether a person is lying on the floor (slip and fall potentially) or sitting, for example. Other inferences can be drawn.

If a separate camera, the camera and depth sensor must be synchronised to ensure that they are looking at the same object.

If an object falls behind an object of furniture, such as a sofa, the object can disappear. This may infer a slip and fall.

Furniture can be eliminated by removing from the detected area of interest. As discussed above, stationary objects can be eliminated over time by not including them in the analysis.

Another approach for detecting accidents such as slip and fall, is as follows:
  using a frontal view of the scene from the depth sensor, an Infra-Red stream of the sensor can be utilised to detect human bodies
  essentially, a number of joints of the human body are detected with varying levels of confidence depending on how much of the body is visible
  the system can calculate the tilt of the body (or its lean (the spine angle) with respect to the vertical
  these pieces of data are analysed for each frame
  the body is then tracked so parameters such as the speed at which the lean increases are calculated
  basic anthropometric measures like body size, Aspect Ratio, posture determination (spine tilt), position are analysed
  based on whether certain thresholds are exceeded this will indicate whether certain events like slip and fall have occurred
  for slip and fall, the idea is that if the tilt of the body is observed to be increasing in any direction leading to a scenario where the head position ends up being close to the floor and the Aspect Ratio inverts, it indicates a positive case. Sometimes, when the head position cannot be determined with full confidence, the depth stream from the sensor can be used to indicate the farthest or nearest points of the body (indicating position of head in backward falling and forward falling cases respectively)
  another process that can be used to trigger a slip and fall event is the speed with which the position of the head approaches the floor.

Other behaviours can be monitored using tracking. These include tracking the flow direction of persons in the scene. For example, too many persons coming from a particular direction. The system may sense persons travelling in an incorrect direction e.g. through a one way airport system. An operator can then be alerted to view the video. Data mining of the image data can be used to detect and track all sorts of behaviours Note that shadows can be detected by building an NMD histogram and then using the NMD histogram in order to discount shadows.

In an embodiment, the sensors also comprise a sensor which has the ability to sense rapid motion of objects in the scene such as arms. It can therefore be used to sense arms flaying about. Sudden and significant arm motion may indicate that there is an assault or fighting or some other form of alert that requires attention. As an alternative to having a sensor which detects rapid arm motion, the processor could be arranged with appropriate algorithms to detect rapid motion adjacent a potential head object, which may indicate rapid arm motion. Image data mining can also be used to determine whether an extreme of the arm (the hand) is flat or is fore-shortened (indicating a fist). Depending on analysis, an operative can be alerted to view the video.

Information from other sensors may be combined with the 3D information to detect or more accurately ascertain other behaviours. For example, clenched fists can be detected and whether arms are moving vigorously, as discussed above. The system can detect whether a person has fallen down. The system can also determine if a crowd has suddenly gathered or dispersed. Another sensor, such as an audio sensor like a microphone, can record the sound level and determine if the sound level has suddenly risen or risen above a certain predetermined level. This is a further input to determining behaviour.

Pick-pocketing is another behaviour that could be detected. For example, we can determine if a person suddenly moves away. Also if a crowd has suddenly gathered or dispersed. Using an audio sensor, we can record the sound level and determine if the sound level has suddenly risen or risen above a certain predetermined level.

The above embodiments relate to the tracking and analysis of behaviour of persons in a scene. In other embodiments, the behaviour of other objects may be analysed. For example, depth and image information may be used to determine whether an object is stationary. This can be used to identify security risks e.g. a stationary piece of luggage in a scene. The behaviour/motion of animals may be detected. Any other object may be surveyed.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A method of surveillance comprising the steps of:
    obtaining image data of a scene, the image data including depth data providing depth information, the depth data being obtained by a depth sensor,
    processing the depth data to identify potential head object(s), that may represent head(s) of persons in the scene, the depth data being processed to determine regions of local minima in the scene, to extract contours of the detected regions of local minima and to determine large enough contours as potential head objects, and
    processing the image data to discount potential head objects within a predetermined lateral distance of potential head objects.

2. The method in accordance with claim 1, further comprising the step of identifying the remaining potential head object(s) as head objects representing the heads of persons in the scene.

3. The method in accordance with or claim 2, wherein the image data comprises a video feed, and the method comprises the further step of processing the image data to track motion of one or more identified head objects.

4. The method in accordance with claim 3, further comprising the step of analysing the motion of a head object and determining the behaviour of a person represented by the head object.

5. An apparatus for surveillance, comprising:
    an image sensor arranged to obtain image data of a scene, the image sensor comprising a depth sensor arranged to obtain depth data providing depth information, and
    a processor arranged to process the depth data to identify potential head objects that may represent heads of persons in the scene, the processor being arranged to determine regions of local minima in the scene, to extract contours of the detected regions of local minima and to determine large enough contours as potential head objects, the processor being further arranged to process the image data to discount potential head objects within a predetermined distance of potential head objects.

6. The apparatus in accordance with claim 5, wherein the image sensor is one of a 3-dimensional camera and a combination of a 2D camera and depth sensor.

7. The apparatus in accordance with claim 6, wherein the processor is arranged to provide a count of the head objects, to provide a count of the persons in the scene.

8. The apparatus in accordance with claim 7, wherein the image sensor is a video camera and the image data comprises a video feed, the processor being arranged to track motion of head objects in order to track motion of persons within the scene.

9. The apparatus in accordance with claim 8, wherein the processor is arranged to determine behaviour of the persons being tracked, on the basis of their motion.

10. A non-transitory computer-readable medium having computer executable instructions for performing a method comprising:
    obtaining image data of a scene, the image data including depth data providing depth information, the depth data being obtained by a depth sensor,
    processing the depth data to identify potential head object(s), that may represent head(s) of persons in the scene, the processing of the depth data comprising determining regions of local minima in the scene, extracting contours of the detected regions of the local minima and determining large enough contours as potential head objects, and
    processing the image data to discount potential head objects within a predetermined lateral distance of potential head objects.

11. The method in accordance with claim 4, wherein the step of analysing the motion comprises analysing a change in the depth data relating to the head object.

12. The method in accordance with claim 1, wherein the image data is obtained by one of a 3D camera and a combination of a 2D camera and a depth sensor.

13. The apparatus in accordance with claim 9, wherein the processor is arranged to track a change in depth data of head objects and determine behaviour based on the change in depth data.

14. The method in accordance with claim 4, wherein the step of processing the depth data comprises processing one or both of the image data and depth data to track rate of change of motion of a head object, and analysing the rate of change of motion to determine the behaviour of a person represented by the head object.

15. The apparatus in accordance with claim 8, wherein the processor is arranged to process one or both of the image data and depth data to track rate of change of motion of a head object, and to analyse the rate of change of motion to determine the behaviour of a person represented by the head object.

16. The method in accordance with claim 4, wherein the step of analysing the motion of a head object to determine behaviour of a person is arranged to track flow direction of head objects in the scene.

17. The apparatus in accordance with claim 8, wherein the processor is arranged to track flow direction of persons in the scene.

* * * * *